March 7, 1961 M. A. SCHOOS 2,973,870

SPRING MOUNTED CURTAIN ROD

Filed May 21, 1959

INVENTOR.
MAURICE A. SCHOOS
BY
Porter, Chittick & Russell
ATTORNEYS

# United States Patent Office 2,973,870
Patented Mar. 7, 1961

2,973,870

SPRING MOUNTED CURTAIN ROD

Maurice A. Schoos, East Greenwich, R.I., assignor to Kenney Manufacturing Company, Cranston, R.I., a corporation of Rhode Island Filed May 21, 1959, Ser. No. 814,695

1 Claim. (Cl. 211—123)

This invention relates to drapery hardware, and more particularly to compression spring supports for curtain rods.

Under certain conditions it is highly advantageous to be able to support a curtain rod between two opposed substantially vertical surfaces by means of spring forces acting outwardly and serving to hold friction shoes at each end of the rod in firm, non-slipping contact with the said vertical surfaces. This invention is concerned primarily with such rods and the manner in which the springs are mounted therein. The conventional construction for such curtain rods employs a cylindrical end piece which carries a friction shoe to which the spring is securely connected. This end piece is then inserted in the end of the rod and secured thereto. Such a construction is satisfactory from an operational point of view, but its cost is high due to extra machining, materials, and labor requirements in assembly.

It is an object of my invention to provide a one piece spring support for curtain rods of this general type in which the spring may be mounted permanently and securely by a simple labor-saving combination of elements.

Further objects and the features of my invention will best be understood and appreciated from the following detailed description of a preferred embodiment thereof, shown in the accompanying drawings, in which.

Figure 1:
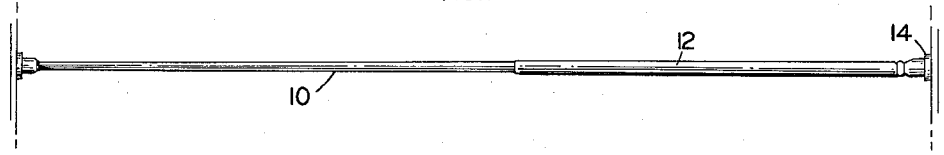
Fig. 1 is a view in perspective of the composite rod employing the spring mechanism of my invention.
Figure 2:
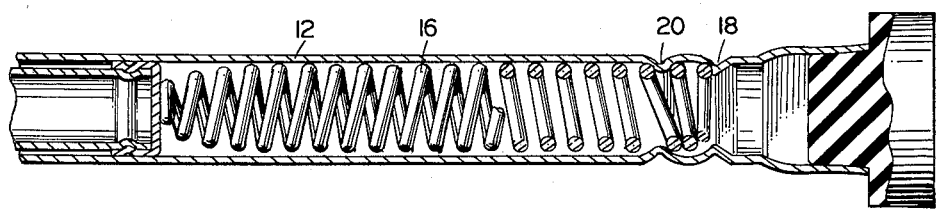
Fig. 2 is an enlarged view in cross section of the spring mounted in one end of the rod.
Figure 3:
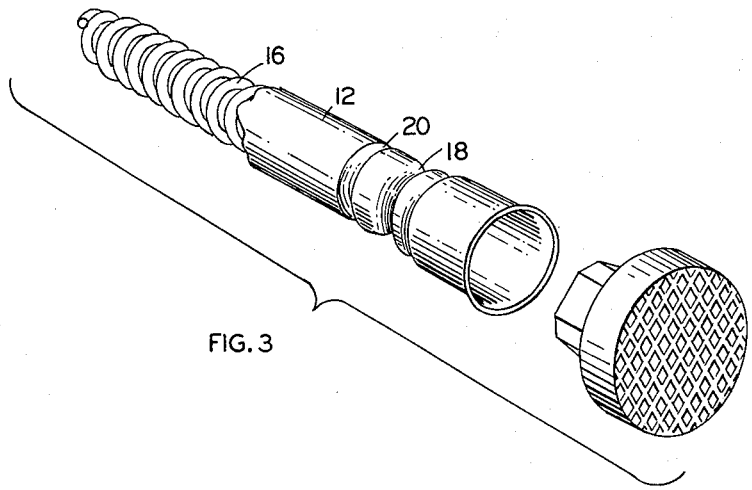
Fig. 3 is a view in perspective of the rod end which carries the spring, and showing the friction shoe in exploded relation.

In its general organization, my invention includes a hollow rod 10 fitting in telescoping relation into a hollow rod 12. The rods 10 and 12 are respectively provided with friction shoes 14 at their outer ends. Internally of the rod 12, the rod 10 comes into abutting relation with a wire coil spring 16 located toward the opposite end of the rod 12.

The transverse dimension of the spring 16 is small enough so that it can side freely within the rod 12. However, its motion is limited therein and the spring 16 is held therein by means of grooves 18 and 20 respectively. The groove 18 is a relatively deep groove and it forms within the rod 12 a restricted passage which is small enough to prevent the spring 16 from passing beyond the groove 18 even when the spring 16 is subjected to heavy pressure. By heavy pressure I mean, by and large, the maximum pressure which a rod of this sort would ordinarily be subjected to in ordinary circumstances. Obviously I do not mean extreme hydraulic pressures which could actually deform the spring or the groove 18. Thus the groove 18 serves as a final abutment for the spring 16 and prevents it from moving beyond the point of the groove 18 within the rod 12. The groove 20 likewise limits motion of the spring 16 within the rod 12, but it is less deep and it forms a less narrowly constricted passage within the rod 12 such that under relatively heavy compression the spring 16 may slip past the groove 20, but under light pressures the groove 20 serves to hold the spring 16 in place against motion in the rod 12.

In one form of my invention, I employ a rod 12 having an outside diameter of approximately 7/16" and a wall thickness of approximately .025". The spring's outer diameter is about .35". The constriction formed by the groove 20 defines a passage approximately .32" across and the passage defined by the groove 18 is approximately .015" narrower. With these dimensions I find that the spring 16 may be inserted in the rod and pressed in place through the constriction formed by the groove 20 and into firm abutment against the constriction formed by the groove 18. Once the spring is in this position, the groove 20 serves to hold it in that position and keep it there for the remainder of the normal use of the rod. It will be understood that little or no force is applied to the spring tending to pull the spring outwardly from the groove 20 other than the weight of the spring itself, and almost all of the compression force applied to the spring is in the direction from the groove 20 towards the groove 18.

From the foregoing description various minor modifications of my invention herein disclosed will now be apparent to those skilled in the art. Therefore, it is not my intention to confine the invention to the precise form herein shown, but rather to limit it in terms of the appended claim.

Having thus described and disclosed a preferred embodiment of my invention, what I claim as new and desire to secure by Letters Patent of the United States is:

A drapery support comprising an elongated body, a hollow casing adapted to receive said body, a compression spring in said casing, first means for limiting motion of said spring in said casing comprising a deep groove in said casing forming a narrowly constricted passage therein of smaller transverse dimension than the smallest transverse dimension of said spring under heavy compression, second means for limiting motion of said spring in said casing spaced from said first means comprising a shallow groove in said casing forming a less narrowly constricted passage therein of sufficiently wide transverse dimension to permit said spring to pass through under heavy compression but narrow enough to restrain said spring against such motion under relatively light pressure, whereby said spring may be inserted in said casing from the end thereof nearest said second means and forced beyond said second means to a position abutting said first means leaving said spring in operative position to abut the end of said elongated body in said casing and urging the same outwardly thereof under spring compression.

References Cited in the file of this patent

UNITED STATES PATENTS

| | | |
|---|---|---|
| 466,940 | Fowler | Jan. 12, 1892 |
| 645,543 | Birch | Mar. 20, 1900 |
| 1,036,813 | Edsall | Aug. 27, 1912 |
| 1,757,437 | Muldoon | May 6, 1930 |
| 1,868,439 | Zielinski | July 19, 1932 |
| 2,320,314 | Trask | May 25, 1943 |
| 2,729,308 | Koski | Jan. 3, 1956 |